(12) United States Patent
Derby et al.

(10) Patent No.: US 6,565,308 B2
(45) Date of Patent: *May 20, 2003

(54) BULK MAIL CONTAINER UNLOADING SYSTEM, APPARATUS AND METHOD

(75) Inventors: Stephen Derby, Troy, NY (US); Matthew Simon, Troy, NY (US); Mark Allen, Middletown, RI (US)

(73) Assignee: The University of the State of New York, State Education Department, Albany, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/063,831

(22) Filed: May 16, 2002

(65) Prior Publication Data

US 2002/0122714 A1 Sep. 5, 2002

Related U.S. Application Data

(63) Continuation of application No. 09/469,380, filed on Dec. 22, 1999, now Pat. No. 6,394,736.

(51) Int. Cl.[7] .............................................. B65G 65/23
(52) U.S. Cl. .................... 414/583; 414/420; 414/811; 414/809; 414/593; 414/575; 414/743
(58) Field of Search ................. 414/816, 810, 414/809, 811, 800, 420, 419, 421, 403, 376, 743, 381, 572, 574, 575, 577, 582, 583, 754, 779, 593, 355, 356, 364, 386, 365; 254/8 R, 3 R, 98

(56) References Cited

U.S. PATENT DOCUMENTS

| 126,466 A | * | 5/1872 | Land ...................... 414/743 X |
| 2,388,987 A | * | 11/1945 | Morrison ................ 414/420 X |
| 3,112,835 A | | 12/1963 | Gierhart |
| 4,175,904 A | | 11/1979 | Airaksinen |
| 4,281,955 A | | 8/1981 | McWilliams |

(List continued on next page.)

FOREIGN PATENT DOCUMENTS

| DE | 11 71 369 | | 6/1964 | |
| DE | 1171369 | * | 6/1964 | ................ 414/421 |
| DE | 12 69 049 B | | 5/1968 | |
| GB | 889 631 | | 2/1962 | |
| GB | 1 037 968 | | 8/1966 | |
| GB | 1037968 | * | 8/1966 | ................ 414/421 |

OTHER PUBLICATIONS

United States Postal Service, SPBS Feed System Unloader Operations Guide, Apr. 1987.

Lockheed Martin, All Purpose Container Unloader (APCU), undated.

(List continued on next page.)

Primary Examiner—Frank E. Werner
(74) Attorney, Agent, or Firm—Jay R. Yablon

(57) ABSTRACT

A Bulk Mail Container (BMC) unloader uses a simple crossed four bar-linkage to move a predetermined point on a BMC unloader in a substantially straight line while the overall BMC unloader rotates about that predetermined point so as to upend the BMC container. This takes advantage of the crossed four-bar's substantially straight-line motion over a limited range of its motion, as well as the rotational motion of the particular unloader link disclosed herein. This is advantageous for unloading. In use, a BMC container is simply rolled into the BMC unloader, and the entire combination of the BMC container and BMC unloader is then actuated to produce substantially straight line motion along a suitably selected "center" point of the BMC unloader while the overall combination rotates about the center point so as to upend the BMC for unloading.

31 Claims, 5 Drawing Sheets

U.S. PATENT DOCUMENTS

| | | | |
|---|---|---|---|
| 4,289,353 A | | 9/1981 | Merritt |
| 4,505,631 A | | 3/1985 | Warner et al. |
| 4,575,302 A | * | 3/1986 | Holden .................. 414/420 |
| 4,863,179 A | | 9/1989 | Isaacs |
| 4,948,324 A | * | 8/1990 | Niederer ............. 414/420 X |
| 4,989,917 A | | 2/1991 | Schmidt, Jr. |
| 5,536,135 A | | 7/1996 | Robertson |
| 5,558,485 A | | 9/1996 | Haynes |
| 5,964,564 A | * | 10/1999 | Hanon et al. ......... 414/779 X |
| 6,394,736 B1 | * | 5/2002 | Derby et al. ............. 414/583 |

OTHER PUBLICATIONS

Lockheed Martin, Pallet Unloader, undated.

web.tusco.net, Tubar Basic Design Drum Dumpers, undated.

Materials Transportation Company, Model H–LE High Lift Dumper, 1998.

Bondtech Treatment Technology, Bondtech Bin Bumper and Autoclave Carts, undated.

Dynamet, Tubular Drag Conveyors, Flexible Screw Conveyors, Hydraulic Gaylord Dumpers, Pneumatic Tilt Tables, Hydraulic Box & Barrel Dumpers, undated.

Ameri–Kart, Residential Waste Handling Systems, undated.

FPEC Pivot Dumper, undated.

* cited by examiner

BULK MAIL CONTAINER UNLOADING SYSTEM, APPARATUS AND METHOD

CROSS REFERENCE TO RELATED APPLICATIONS

This application is a continuation of application Ser. No. 09/469,380 filed Dec. 22, 1999, now U.S. Pat. No. 6,394,736 issued May 28, 2002, which is hereby incorporated by reference.

BACKGROUND OF INVENTION

This invention relates generally to the field of material or article loading and unloading, and specifically, to the unloading of Bulk Mail Containers (BMCs).

Devices for unloading containers exist in many forms. Few of these, however, are suitable for free standing use in an enclosed environment. Unloaders for U.S. Post Office Bulk Mail Containers are even less common. Those that do exist, for example, the Lockheed-Martin/USPS SPBS Feed System Unloader, are bulky, with several degrees of freedom necessary for the unloading process and, consequently, several unloading stages and multiple actuators. In the unloading process, these devices generally take advantage of the constant feature that all BMCs unload through an open top thereof. Additionally these devices require the loading of the BMC into the device, not moving the device to the container. It is also difficult to use these unloaders in a confined indoor space, and ceiling heights in excess of 9 feet are often required.

It would be desirable to have a BMC unloader which suitably upends and unloads a BMC with minimal actuation, causing rotational movement about the center of mass simultaneously with horizontal translation of the center of mass.

It would also be desirable for the movement associated with the unloading process to be capable of occurring in a confined indoor space, for example, with a maximum ceiling height requirement of no more than approximately 9 feet during any phase of operation.

It would also be desirable for a BMC unloading device and method to accomplish the unloading task in less time, in a smaller operational space, at less cost, and with greater reliability than existing devices and methods designed for the same task.

SUMMARY OF INVENTION

Crossed 4-bar linkages are a well known mechanism for producing substantially straight line motion. The motion of a point on a device attached to the linkage approximates a straight line, replacing the need for a slider joint. However, with a suitable choice of crossed 4-bar linkage design, and in particular, with a suitable specification of various dimensions and proportions for the bars and pivot point separations of a crossed 4-bar linkage, the entire attachment can be moved in a way that is highly suitable for unloading, and that is not disclosed or suggested by the prior art.

In particular, a Bulk Mail Container (BMC) unloader in a preferred embodiment of the invention uses a simple crossed four bar-linkage of certain specified dimensions and proportions to move a predetermined point on a BMC unloader in a substantially straight line while the overall BMC unloader rotates about that predetermined point so as to upend the BMC container. This takes advantage of the crossed four-bar's substantially straight-line motion over a limited range of its motion, as well as the rotational motion of the particular unloader link disclosed herein.

In use, a BMC container is simply rolled into the BMC unloader, and the entire combination of the BMC container and BMC unloader is then actuated to produce substantially straight line motion along a suitably selected "center" point of the BMC unloader, while the overall container/unloader combination rotates about this center point so as to upend the BMC for unloading.

BRIEF DESCRIPTION OF DRAWINGS

The features of the invention believed to be novel are set forth in the appended claims. The invention, however, together with further objects and advantages thereof, may best be understood by reference to the following description taken in conjunction with the accompanying drawing(s) in which:

DETAILED DESCRIPTION

Figure 1:
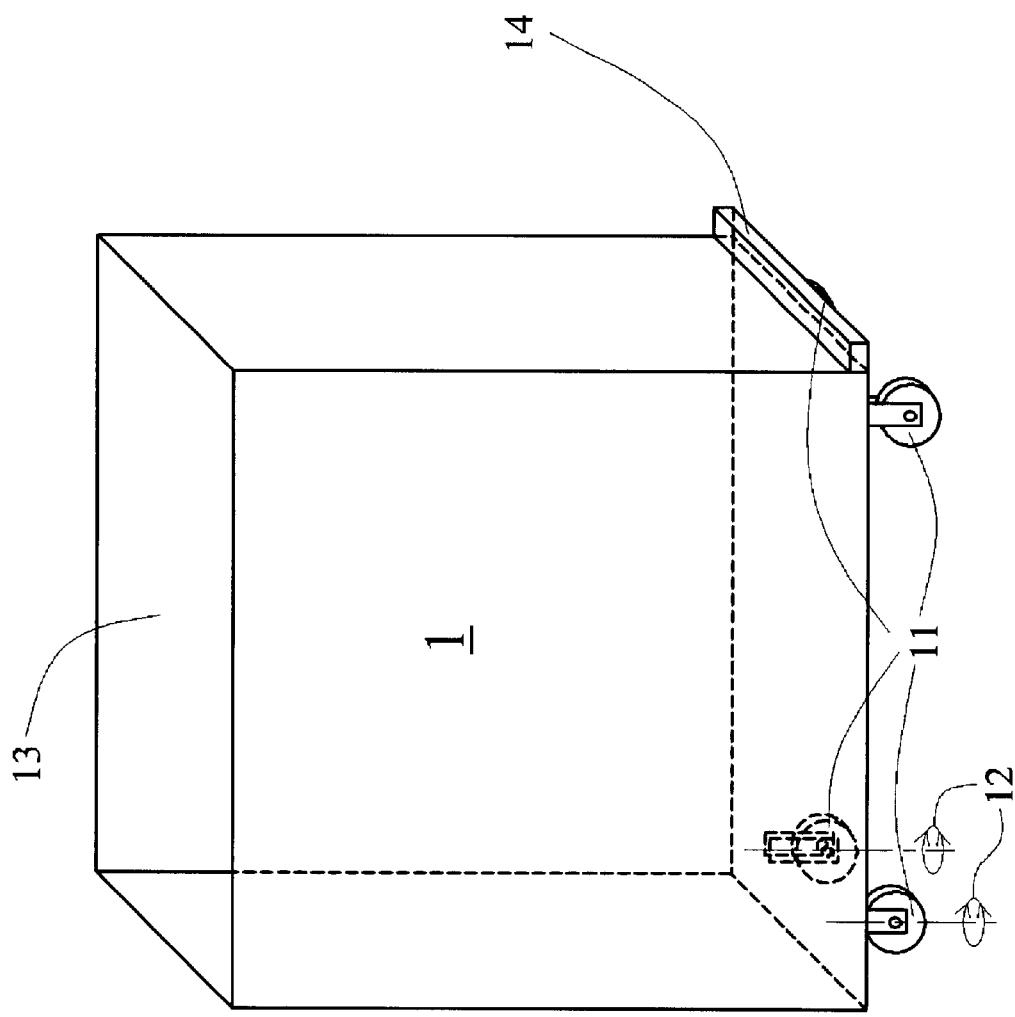
FIG. 1 illustrates in perspective view, a typical BMC container which is unloaded using the system, apparatus and method disclosed herein.

FIG. 1 illustrates a typical bulk mail container (BMC) 1, such as is commonly used throughout the U.S. Post Office system and by other entities such as large businesses, libraries, etc. that receive large quantities of mail in BMCs. BMC 1 typically comprises a plurality of BMC wheels 11 such as the four wheels illustrated. Two of these four wheels are typically attached so as to swivel about the illustrated center lines 12, which facilitates the steering of BMC 1 as it is rolled using BMC wheels 11. BMC 1 is typically enclosed along its bottom as well as along its four walls, and comprises a loading and unloading opening 13 along its top, through which it is loaded and unloaded. Of course, when BMC 1 contains a particularly large and heavy load, items within BMC 1 must either be unloaded by hand, or must be dumped out of BMC 1 by suitably upending BMC 1 so that opening 13 becomes oriented in a generally downward direction. Often, the materials within BMC 1 will weigh hundreds of pounds, if not more. The front of BMC 1 typically also has a 2-inch lip 14 at the base of its body, which is often used as a form of "bumper."

A crossed 4-bar linkage design is employed as described below, to facilitate the upending and controlled unloading of BMC 1. The motivating principles behind this design concern minimizing actuation, and causing rotational movement about the center of mass simultaneously with vertical translation of the center of mass toward an unloading surface such as a conveyor belt. Practically, achieving a design with optimized conditions for all three of these constraints is challenging, due to several difficult-to-quantify properties of the linkage in motion. These quantities include the path of motion of the center of mass, clearance of the BMC wheel with respect to the ground, the dumping height, and the dumping angle.

Figure 2:
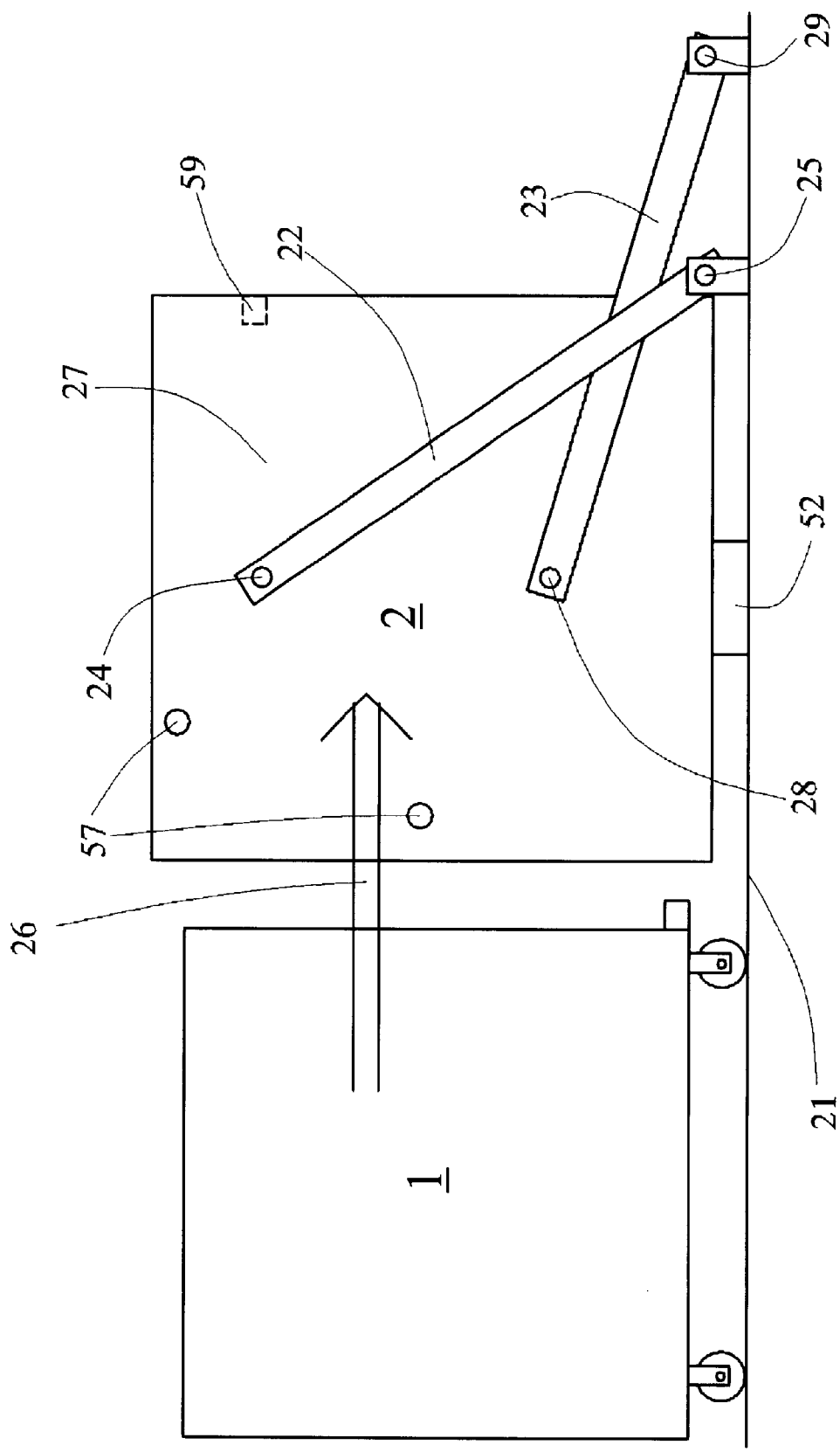
FIG. 2 is a side plan view illustrating a BMC unloader according to a preferred embodiment of the invention, shown alongside the typical BMC container of FIG. 1.
Figure 4:
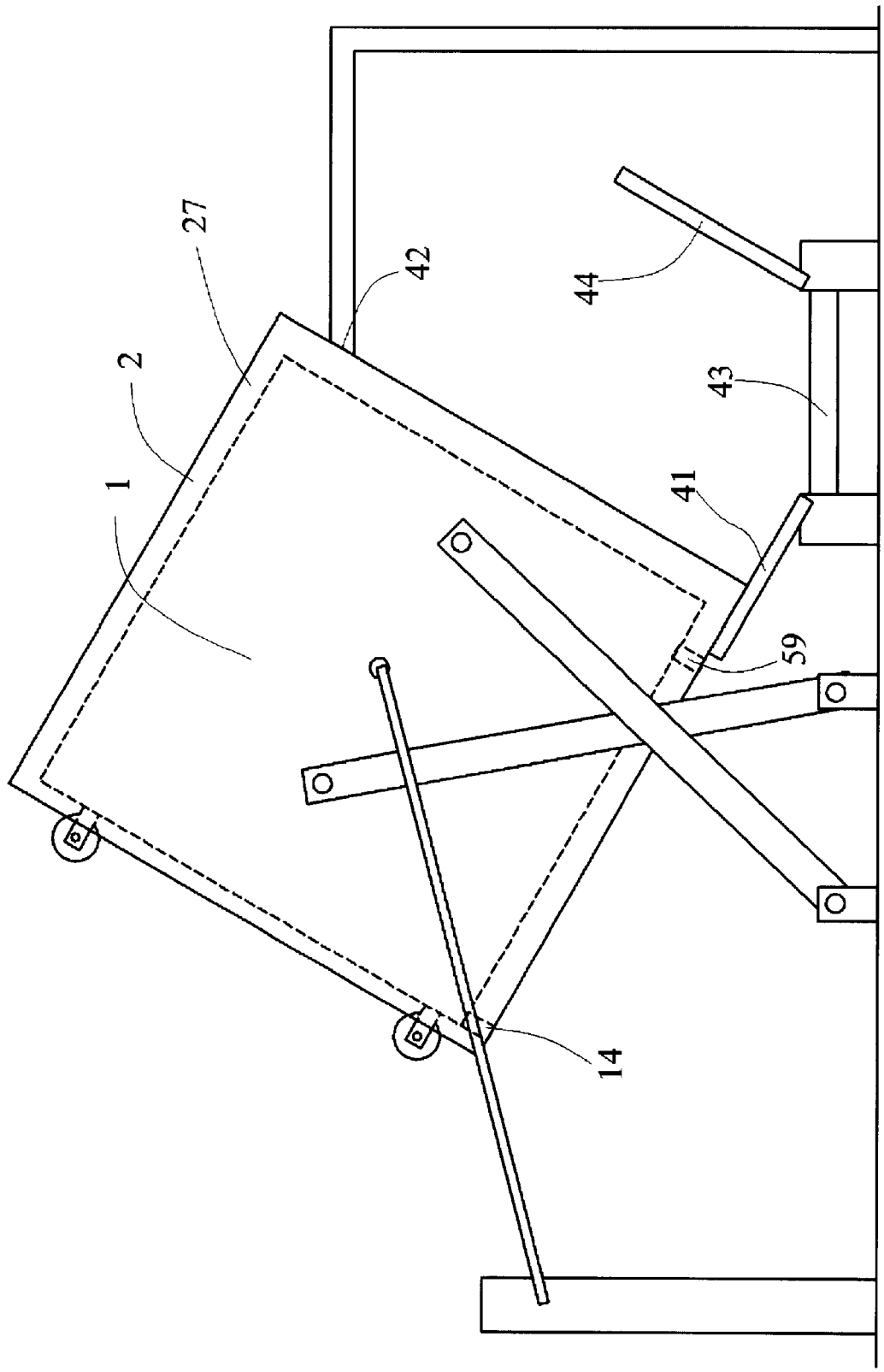
FIG. 4 is a side plan view illustrating a conveyor and related components of the preferred embodiment of the invention.
Figure 5:
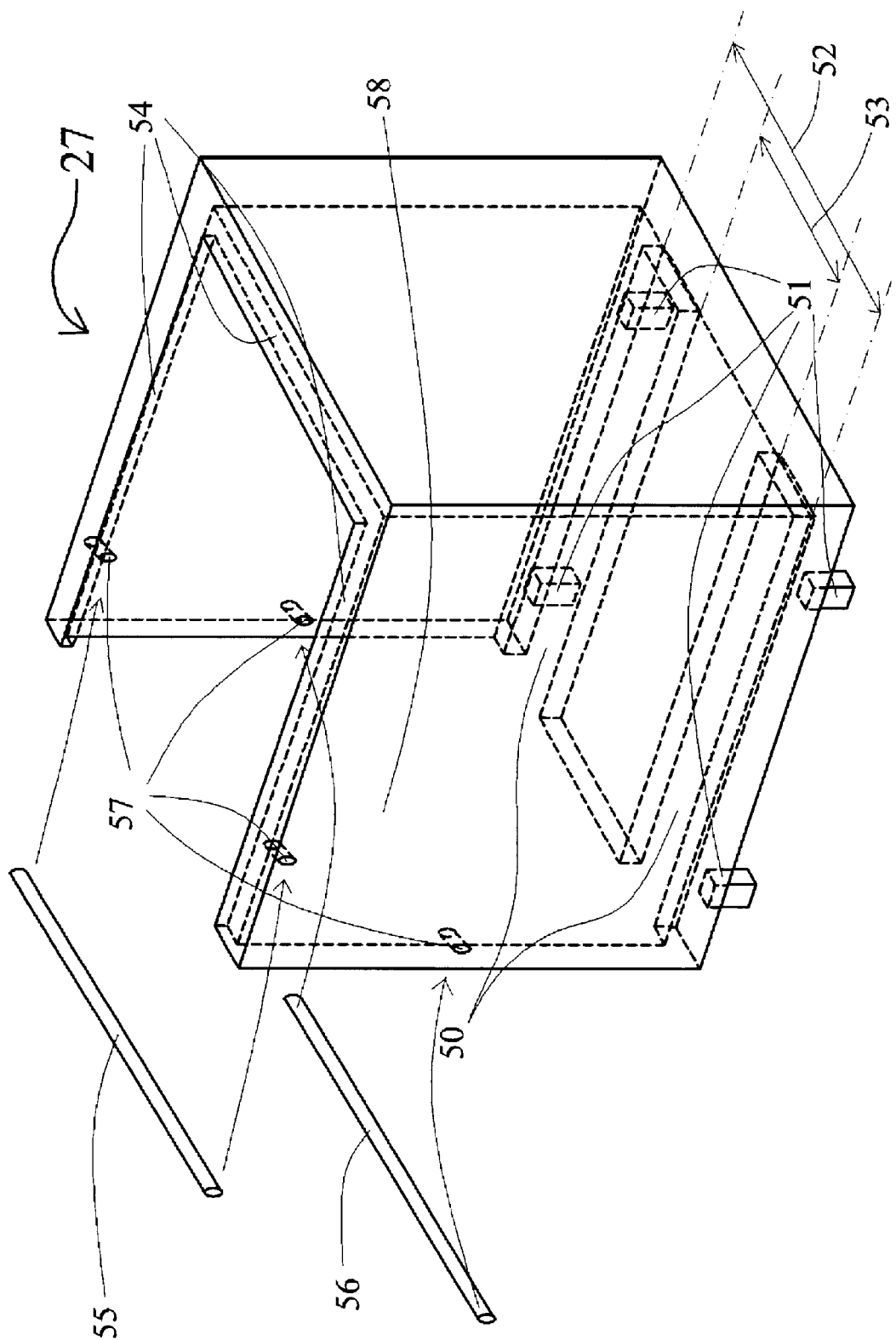
FIG. 5 is a perspective view of a BMC unloading bin of the BMC unloader, illustrating how the BMC unloading bin is designed to accommodate the BMC container that it is used to unload.

FIG. 2 illustrates a BMC unloader 2 according to a preferred embodiment of the invention, shown substantially to scale alongside BMC 1. BMC 1 and BMC unloader 2 are shown resting on the ground 21 below. A pair of crossed bars, comprising upper bar 22 and lower bar 23 are pivotally attached to a BMC unloading bin 27 of BMC unloader 2 at respective upper and lower unloader linkage pivot points 24, and are pivotally attached proximate ground 21 at respective inner and outer ground linkage pivot points 25, all as illustrated. Unloader and ground linkage pivot points 24 and 25 are fixed attachments permitting no linear movement, but only a pivotal rotation about pivot points 24 and 25. The side plan view of FIG. 2 shows only one side of BMC unloader 2. A substantially identical pair of crossed bars is located on the far (hidden) side of BMC unloader 2. BMC unloader 2 thus comprises a total of four bars 22, 23, (two bars 22 and two bars 23) and eight linkage pivot points 24, 25 (four pivots 24 and four pivots 25), as well as BMC unloading bin 27. Also illustrated, which will be discussed further in connection with FIGS. 4 and 5, are restraining bar receptacles 57 and a bumper lip compensator 59.

In use, as will be described in much further detail below, BMC 1 is moved (rolled) into BMC unloader 2 along the direction indicated by arrow 26, and the combination of BMC 1 and BMC unloader 2 is then actuated so as to be simultaneously linearly displaced and rotationally upended.

Figure 3:
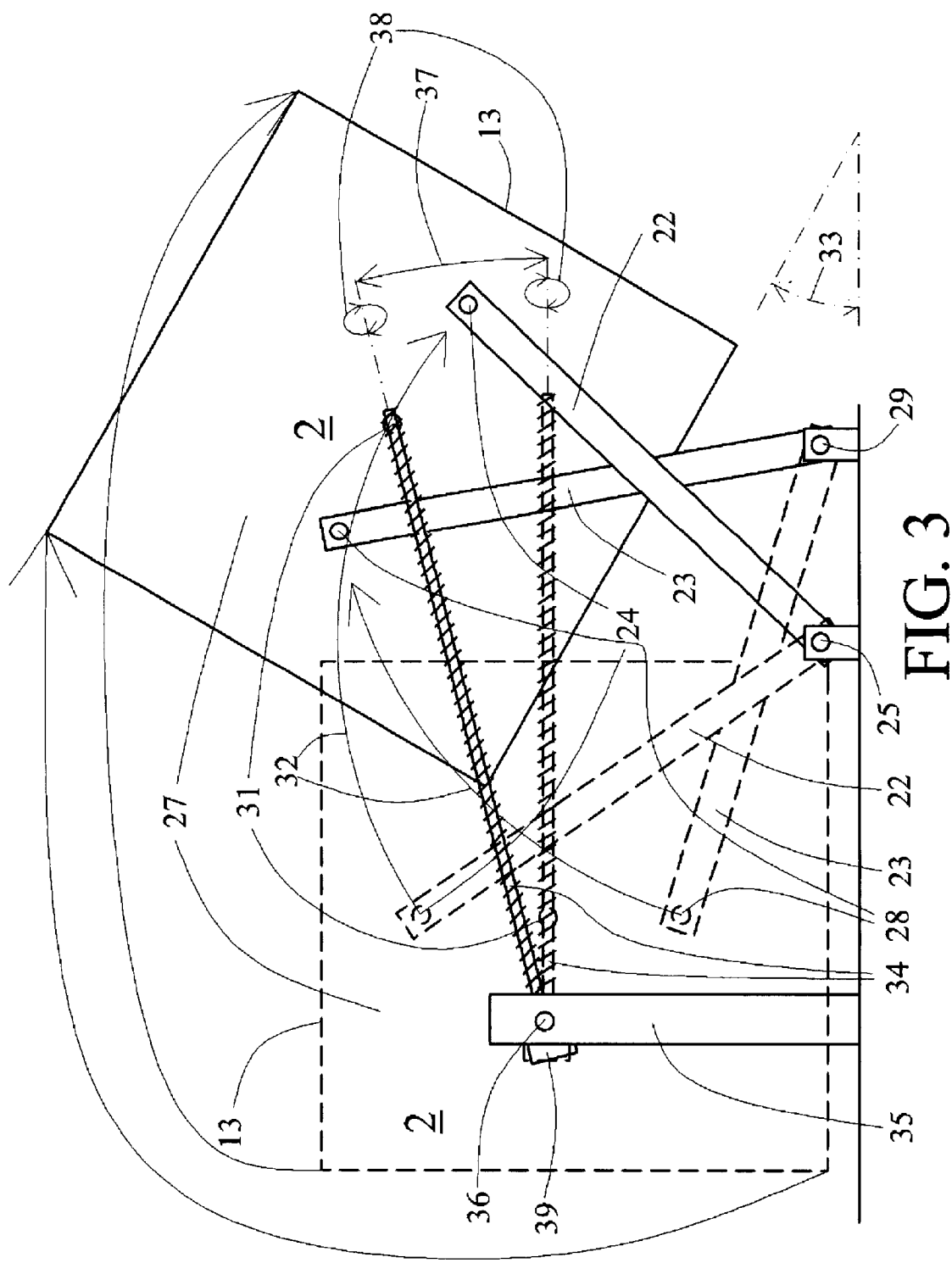
FIG. 3 is a side plan view illustrating the geometric movement of the BMC unloader of FIG. 2, as it is actuated for unloading.

FIG. 3 illustrates the geometric movement of BMC unloading bin 27 as it is actuated for unloading. The broken lines show BMC unloader 2 in its upright position of FIG. 2; the solid lines show BMC unloader 2 in its upended, unloading position. The illustrated linkage moves BMC unloading bin 27 about a predetermined "center" point 31 of BMC unloading bin 27, preferably though not limited to the center of geometry. Since BMCs are loaded with a variety of combinations of materials, it is impossible to generalize the location of the center of mass of a fully or partially loaded BMC, especially since material shifts during the emptying process. The center of geometry is an adequate compromise, allowing the linkage to act on every BMC 1 in the same manner. The path of this center point 31 is not precisely linear and horizontal, but is a very mild arc that very closely approximates linearity over a significant range of the motion. As can be seen, unloader linkage pivot points 24 will each rotate through linkage point paths 32 illustrated by the circular arcs, while the overall loader bin moves generally toward the right of FIG. 3 at the same time that it is rotated by about 120 degrees, such that the dumping angle 33 is approximately 30 degrees. Unnumbered arrows—which are schematic and do not illustrate actual geometric paths— show the correspondence of two of the corners of BMC unloading bin 27 throughout this range of movement. Generally, "center" point 31 is the point about which BMC unloading bin 27 rotates as it is also translated for unloading; in a preferred embodiment, it coincides with the center of geometry.

Also illustrated is an actuator 34 attached at a first end to a fixed actuator frame 35 with the freedom to pivot 37 about actuator pivot point 36. At its second end, it is pivotally attached to and at center point 31 of BMC unloading bin 27. Employing an actuator 34 for a system in which the center of geometry moves along a perfectly straight, horizontal path, would allow for the actuator to be rigidly attached at is first end, i.e., without the need to pivot 37. However, because center point 31 moves along a very mild arc path (almost, but not quite a straight line), both ends of actuator 34 must be free to pivot. Actuator 34 extends from actuator frame 35 so as to push BMC unloading bin 27 along the path illustrated by FIG. 3. Thus, when BMC unloading bin 27 is upright (broken line illustration), actuator 34 (broken line also) is fully retracted, while when BMC unloading bin 27 is in its unloading position (solid line illustration), actuator 34 (solid line also) becomes fully extended. The side plan view of FIG. 3 again shows only one side of BMC unloading bin 27. A second actuator 34 is similarly attached between a second actuator frame 35 and a second center point 31 on the opposite, hidden side of BMC unloading bin 27. At full extension, actuators 34 must extend at least 5.5 feet, given dimensions of typical BMCS, and the other dimensional parameters discussed below.

In the preferred embodiment, the two actuators 34 each comprise a lead screw rotated 38 by actuator rotation means 39 such as any standard motor. These motors or equivalents are attached to actuator frames 35 such that they are enable to pivot about actuator pivot points 36. The two center points 31 (one on each side) of BMC unloader 2 each comprise a nut pivotally attached thereto, or equivalent means, through which the lead screws pass. It is easy to see that as the lead screws are rotated 38 at their first ends by actuator rotation means 39, the rotation 38 of the second "contact ends" of these lead screws through the nuts or equivalents of center points 31 will push or pull the entire BMC unloader 2 in a substantially lateral direction, either away from or toward its upright position. These "contact ends" are to be understood as defining the points at which actuators 34 come into contact with and push or pull the two center points 31, and not necessarily the physical "ends" of the actuator. This is emphasized by observing that the broken line portion of FIG. 4 illustrates the lead screw actuator embodiment protruding well beyond (to the right of) center points 31, since the nature of this particular embodiment is that the lead screws actually passes through the nuts as they push BMC unloader 2 toward its upended, unloading position. Other equivalents or substitutes for this embodiment of actuators 34, such as, but not limited to telescoping hydraulic systems known in the art, and any other system to provide a "push" (i.e., to linearly extend) along a substantially straight line, may also be apparent to someone or ordinary skill, and are considered to be within the scope of this disclosure and its associated claims. For some of these, the push/pull "contact end" may also coincide the "physical" end.

Thus, when actuators 34 are actuated to move BMC unloading bin 27 from the upright position shown toward the left side of FIG. 3 to the upended position shown toward the right side of FIG. 3, and when BMC container 1 has been moved 26 (see FIG. 2) into BMC unloader 2 as will be further described below in reference to FIG. 5, the net result is that BMC container 1 is translated substantially linearly (to the right as illustrated by FIG. 3), and is also rotated through approximately 120 degrees to allow dumping of its contents at dumping angle 33 of approximately 30 degrees. As will be discussed below, dumping angle 33 can be varied somewhat within the scope of this disclosure and its associated claims.

As described above, BMC unloader 2 comprises two identical linkages mounted on either side of BMC unloading bin 27. In the preferred embodiment, BMC unloader 2 is designed to the following specifications, which were selected based on the size and weight characteristics of a typical bulk mail container (BMC) 1 such as was illustrated in FIG. 1. These specifications are for illustration only, and are not limiting. It is to be understood that someone of ordinary skill might change these specifications and still fall within the scope of what is anticipated or rendered obvious by this disclosure, and within the scope of the associated claims. It is also to be observed that the overall motion path is determined by the relative proportions of the following dimensional parameters: 1) the separation between ground linkage pivot points 25, 2) the lengths of upper bar 22 and lower bar 23, and 3) the separation between upper and lower unloader linkage pivot points 24.

The ground linkage pivot points 25 are optimally separated by approximately 22.5 inches. This can be varied by ±½ inch with minimal effect, but up to ±1 inch is acceptable, so long as it is understood that changes in this separation affect the initial BMC unloader 2 height, as well as its final position.

Upper bar 22 and lower bar 23, optimally, are of substantially identical length, with a distance of approximately 61.75 inches between the pivot points at either end of these bars. Here too, this can be varied by ±½ inch with minimal effect, and up to ±1 inch is acceptable. Variations in these bar lengths affect a number of variables including dumping angle 33, the initial height and final position of BMC unloader 2, the initial clearance for BMC wheels 11, and the maximum (ceiling) height reached by BMC unloader 2 during it motion from an upright to an unloading position.

When BMC unloader 2 is in its upright position (broken line drawing), the lower unloader linkage pivot points 24 are located approximately (x, y)=(−35.5, 20) inches from the lower right corner of BMC unloading bin 27 as viewed in FIGS. 2 and 3. Similarly, the upper unloader linkage pivot points 24 are located approximately (x, y)=(−35.5, 50) inches from the lower right corner of BMC unloading bin 27 as viewed in FIGS. 2 and 3. Thus, the separation between upper and lower unloader linkage pivot points 24 is approximately 30 inches, with the upper unloader linkage pivot approximately 15 inches above, and the lower unloader linkage pivot approximately 15 inches below, the approximate center of geometry of BMC unloading bin 27. In other words, the midpoint of the separation between upper and lower unloader linkage pivot points 24 coincides approximately with the center of geometry of BMC unloading bin 27. This separation can also be varied by ±½ inch with minimal effect, and up to ±1 inch is acceptable. Variations in this separation affect the initial height of BMC unloader 2.

FIG. 4 provides further illustration of the unloading process. Once BMC 1 has been moved (26) into BMC unloader 2 (see FIG. 2 and discussion to follow in connection with FIG. 5), and the combination thereof has been rotated through approximately 120 degrees as earlier described in connection with FIG. 3, the overall system achieves the configuration illustrated in the side plan view of FIG. 4. A portion of BMC unloading bin 27 comes to rest on a lower mechanical stop 41, which is also oriented at approximately 30 degrees and located so as to make contact with and overlap an upper region of the forward outer surface of BMC unloading bin 27 (said upper region defined with reference to when BMC unloading bin 27 is in the upright position of FIG. 2 and said forward outer surface defined with respect to the translational movement of FIG. 3), substantially as shown. Lower mechanical stop 41 thus confines dumping angle 33 to approximately 30 degrees or less, and prevents the BMC unloader 2 from inverting too far. Another portion of BMC unloading bin 27 comes to rest on an upper mechanical stop at 42, which restrains a rearward portion of the top surface of BMC unloading bin 27 (said top surface defined with reference to when BMC unloading bin 27 is in the upright position of FIG. 2 and said rearward portion defined with respect to the translational movement of FIG. 3) from moving too far into the upside down position when BMC unloading bin 27 is upended for unloading, also substantially as illustrated. Upper mechanical stop 42 also confines dumping angle 33 to approximately 30 degrees or less, and prevents BMC unloader 2 from inverting too far.

An unloading surface 43 such as a table, or in a preferred embodiment, a conveyor belt or similar equivalent conveyance means shown in FIG. 4 from an end view (i.e., with conveyance into and out of the drawing page), resides proximate the base of lower mechanical stop 41 to receive and transport the material contents of BMC 1 as they are being dumped out of BMC 1. An optional unloading restraining wall 44 ensures that materials dumped out of BMC 1, across lower mechanical stop 41, and onto unloading surface 43, do not overflow onto and fall off of unloading surface 43. Human operators can also manually slide the contents of BMC 1 over lower mechanical stop 41 and onto unloading surface 43, so as to control the rate at which materials flow out of BMC 1 and onto unloading surface 43, and, if unloading surface 43 is a conveyor belt, can do so in relation to the rate at which this conveyor belt is moving. This enables a steady, controlled flow of the material contents out of BMC 1. For reference, the above shall be referred to generally as an "unloading station" comprising at least unloading surface 43, and also, preferably lower mechanical stop 41, upper mechanical stop at 42, and unloading restraining wall 44.

The benefits of the simultaneous translation and rotation of BMC unloader 2 earlier described in connection with FIG. 3 should now be clear. The translational movement brings BMC 1 over toward unloading surface 43 at the same time that the rotational movement suitably upends BMC 1 so that its contents can be dumped out onto unloading surface 43. This is a unitary motion combination, with but a single degree of freedom, which greatly simplifies actuation as well as the overall dumping process.

It is also to be observed how bumper lip compensator 59 compensates for BMC lip 14 so as to ensure that BMC 1 is squarely centered within BMC unloader 2 and BMC unloading bin 27. Obviously, a wide range of such bumper lip compensators can be conceived of by someone of ordinary skill within the scope of this disclosure and its associated claims.

At this point, while the overall dumping and unloading system, apparatus and method of has been described for a preferred embodiment of the invention, it is important to describe in further detail, precisely how BMC unloader 2, particularly BMC unloading bin 27, is configured so as to accommodate BMC 1, i.e., how BMC 1 can be moved 26 into BMC unloader 2, and then suitably restrained during upending, for unloading as heretofore described. This is illustrated in FIG. 5.

The geometry of BMC unloading bin 27 is formulated to accommodate several notable features of a standard BMC 1, as follows:

First, BMC unloading bin 27 is closed on three of its four sides. The fourth side is open, comprising a BMC entryway 58 for passage of BMC 1 into BMC unloading bin 27 as shown by arrow 26 in FIG. 2.

As discussed in connection with FIG. 1, a standard BMC 1 has four BMC wheels 11. The two fixed (non-pivoting) wheels 11, shown toward the right side of FIG. 1, are typically 34 inches apart. The two pivoting 12 wheels 11, shown toward the left side of FIG. 1, are typically 24 inches apart. Consequently, BMC unloading bin 27 comprises a pair of BMC wheel slots 50 in its base to accommodate these wheels, ranging from an outer wheel distance 52 of at least 34 inches to an inner wheel distance 53 of at most 24 inches. BMC 1 is loaded into BMC unloading bin 27 fixed wheels first, to provide maximum control over maneuvering BMC 1 into BMC unloading bin 27 to the individual performing this task.

To facilitate loading BMC 1 into BMC unloading bin 27, BMC unloading bin 27 sits 4 inches off the ground. This is accomplished with either the addition of legs 51 to BMC unloading bin 27, or of a stationary block 52 (see FIG. 2) on which BMC unloading bin 27 rests when not active.

For simplicity, bumper lip compensator 59, which was already discussed in FIG. 4, has been omitted from FIG. 5.

Three devices secure BMC 1 to BMC unloading bin 27 during unloading: a restraining ledge 54, an upper restraining bar 55, and a side restraining bar 56. Restraining bars 55 and 56 slide into and engage restraining bar receptacles 57 as shown by the associated arrows. Restraining ledge 54, in conjunction with upper restraining bar 55, prevents BMC 1 from sliding out the top of BMC unloading bin 27 when BMC 1 is upended. While illustrated on all three edges of the top opening of BMC unloading bin 27, restraining ledge 54 may also be varied so as to run only along all or part of the edge farthest from BMC entryway 58, since this is the region that needs to support the most weight once BMC 1 is upended. Side restraining bar 56 holds BMC 1 into BMC unloading bin 27 and prevents possible motion out the BMC entryway 58 of BMC unloading bin 27. Side restraining bar 56 is secured after the operator has moved BMC 1 into BMC unloading bin 27. Upper restraining bar 55 is either secured in this manner, or is a permanent part of the structure of BMC unloading bin 27. Creating additional positions for additional bars is an option within the scope of this disclosure and its associated claims, which allows BMC unloading bin 27 to accommodate other types of bins. And of course, other equivalent substitute or complementary BMC securing and restraining means for securing and restraining BMC 1 within BMC unloading bin 27 while BMC unloading bin 27 is rotated through more than 90 degrees that would be apparent to someone or ordinary skill are also encompassed within this disclosure and its associated claims.

With the particular specifications provided above (which may, of course, be varied by someone of ordinary skill within the scope of this disclosure and its associated claims), the maximum height of the machine during any stage of the upending operation is 9 ft, so that this operation can be performed in most enclosed indoor spaces.

Optional proximity sensors (not shown) may be employed as an emergency safety feature to detect presence of person in this area. If interrupted, these trigger an emergency stop to cease any further motion of the machine.

Isolation of moving parts should be employed wherever possible.

Actuation takes place at the approximate geometric center points 31 of the side of BMC unloading bin 27, as noted earlier, and as shown in FIGS. 3 and 4. This is desirable for several reasons. First, Because BMC unloader 2 rotates about the center of geometry (which is chosen to coincide as closely as possible to the center of mass, given the variations in load and load distribution discussed earlier), actuation at this point requires less vertical lifting in favor of horizontal pushing of BMC unloader BMC 1 and its load. Also, the entire unloading process is controlled by pushing at these points, and various moments about center points 31, are minimal, and at least offset one another.

As noted above, dumping angle 33 is optimally about 30 degrees. It can, however, be varied by ±1.5 degrees, and even as much as ±3 degrees, by the possible adjustments noted above of the relative proportions of the separation between ground linkage pivot points 25, the lengths of upper bar 22 and lower bar 23, and the separation between upper and lower unloader linkage pivot points 24. However, experimental testing to determine the optimal angle necessary to completely empty BMC 1 of its contents indicates that a dumping angle 33 of 30 degrees causes most material contents to leave the BMC, without the dumping operation getting out of control (i.e., dumping that is too rapid). However, since some items may occasionally become caught in the latticework at the top of a typical BMC 1, the user of this system, apparatus and method may have to run BMC 1 through its upending process a second time to empty any remaining material contents so-caught. Testing also reveals that dumping angle 33 should not be less than about 25 degrees. Also, the user may not wish to completely empty BMC 1 for product flow reasons. Using the configuration of FIG. 4 including unloading surface 43, it becomes possible to capture material leaving BMC 1 at a variety of positions before the final dumping position is achieved.

The advantage of the crossed four bar linkage comprising upper bar 22 and lower bar 23, described particularly in reference to FIG. 3, is that the unloading motion is confined to one degree of freedom. Therefore, only one actuator 34 is required to move BMC unloader 2, and consequently BMC 1, through the unloading motions. In actuality, since two linkages (i.e., two upper 22 and lower 23 bar pairs) are required for symmetry (one pair for each side of BMC 1), two actuators 34 are required.

The unloading motion, by the nature of the four bar linkage, is itself smooth, and warrants easy operator control for a gradual, but single step, unloading process. The crossed four bar causes a substantially straight-line motion to occur for center point 31 of BMC unloading bin 27, by the very nature of the mechanism. But additionally, the rotation about center point 31 that accompanies this substantially straight line motion is advantageous for the unloading process, because BMC 1, suitably moved 26 into BMC unloader 2, follows this motion.

In an alternative embodiment, BMC unloader 2 is designed so that BMC 1 is rotated about a point at its front, with the unloading motion of the BMC entirely rotational about this point. In other words, upper bar 22 and lower bar 23 may be pivotally attached to a BMC unloading bin 27 so as to create a predetermined "center" point 31 at a location other than the approximate geometric center. This can then be applied to other applications for unloading smaller open topped containers and bins.

In the preferred embodiment heretofore described, the length of the overall equipment footprint, running from the left hand side of BMC unloading bin 27 when it is upright as in FIG. 2, to the right hand side of FIG. 4, is approximately 12 feet. The footprint width (the hidden depth in FIGS. 2, 3 and 4) is approximately 8 feet. With a 9 foot ceiling clearance required, the overall operational space is this 12 feet long×8 feet wide×9 feet high, which is a substantial improvement over the prior art. In particular, prior art devices such the aforementioned Lockheed-Martin/ USPS SPBS Feed System Unloader require a "warehouse" type ceiling with a height substantially in excess of 9 feet.

This device and method heretofore disclosed is commercially valuable because it accomplishes the task of several people in far less time, in a smaller operational space, at less cost, and with greater reliability than other current devices that accomplish the same task.

It is also to be observed as noted earlier that the overall motion path is determined by the relative proportions of the following parameters: 1) the approximately 25 inch separation between ground linkage pivot points 25, 2) the approximately 61.75 inch lengths of upper bar 22 and lower bar 23, and 3) the approximately 30 inch separation between upper and lower unloader linkage pivot points 24. Thus, for unloading applications other than BMC unloading, on a size scale other that of BMCs, one would simply scale these parameters up or down in proportion to one another to achieve the same overall combination of translational and rotational (upending) motion. In this context, bulk mail container (BMC) 1 generalizes to a container, the bulk mail container (BMC) unloader system heretofore described generalizes to a container unloader, BMC unloader 2 generalizes to a container unloader, and BMC unloading bin 27 generalizes to an unloading bin.

Finally, it is also important to emphasize that this particular choice of proportions in this particular combination, which was uncovered by applicants following extensive modeling and experimentation, as opposed to other possible choices of proportions in other possible combinations, is what is responsible for generating the unique simultaneous translational and rotational motion of BMC unloading bin 27 that enables and underlies the BMC unloading disclosed herein, and is what distinguishes applicants' crossed four bar linkage in a novel and nonobvious or inventive way from other crossed four bar linkages that may be known in the art.

Of course, further points of patentable distinction over the prior art are provided, for example, not limitation, by: the method of using of crossed four bar linkages of these or any other proportions specifically for unloading applications generally and for BMC unloading applications specifically; the use of an unloading station such as described earlier in combination with crossed four bar linkages of these or any other proportions; the particular BMC unloading bin 27 configuration disclosed above (or equivalents) that enables BMC unloading bin 27 to engage and invert a BMC 1 in connection with crossed four bar linkages of these or any other proportions; and the actuation of this system through greater than ninety degrees using a substantially linearly extending actuator, both generally and specifically as described above.

While only certain preferred features of the invention have been illustrated and described, many modifications and changes will occur to those skilled in the art. It is, therefore, to be understood that the appended claims are intended to cover all such modifications and changes as fall within the true spirit of the invention.

What is claimed is:

1. A container unloader system, comprising:
   an unloading bin comprising an upper unloader linkage pivot point on each side thereof and a lower unloader linkage pivot point on each side thereof;
   an inner ground linkage pivot point on each side thereof and an outer ground linkage pivot point on each side thereof;
   two upper bars, one on each side of said unloading bin, each pivotally attached at a first end to said upper unloader linkage pivot point on its side of said unloading bin, and each pivotally attached at a second end to said inner ground linkage pivot point on its side of said unloading bin;
   two lower bars, one on each side of said unloading bin, each pivotally attached at a first end to said lower unloader linkage pivot point on its side of said unloading bin and each pivotally attached at a second end to said outer ground linkage pivot point on its side of said unloading bin, the lower bar and upper bar on each side of said unloading bin thereby crossing one another as a result of said attachments; and
   a ratio of approximately 25±1 to 61.75±1 to 30±1, respectively, among: on the same side of said container unloader, a separation between each said inner ground linkage pivot point and outer ground linkage pivot point; and
   a length of each of said upper bars and each of said lower bars between said pivotal attachment points at said first and second ends thereof; and
   on the same side of said unloading bin, a separation between each said upper unloader linkage pivot point and said lower unloader linkage pivot point, said separation being substantially vertical when said unloading bin is in an upright position; whereby:
   the translation and rotation of said unloading bin is constrained to a single degree of freedom, and said single degree of freedom is uniquely specified by, the attachments of the bars to the linkage pivot points in combination with said 25±1 to 61.75±1 to 30±1 ratio.

2. The system of claim 1, wherein
   to translate said unloading bin and simultaneously rotate said unloading bin through an arc about a pair of predetermined center points thereof, one such center point on each side of said unloading bin, said predetermined center points are mechanically actuated along a substantially straight line.

3. The system of claim 1, wherein:
   said unloading bin is structured in relation to a predetermined structure of a container to be unloaded so as to contain said container, such that, when contained by said unloading bin, and when said unloading bin is translated and rotated, said container is translated and rotated along with said unloading bin, and thereby unloaded.

4. The system of claim 1, said container unloader system comprising a bulk mail container (BMC) unloader system and said unloading bin comprising a BMC unloading bin, wherein:
   each of said inner ground linkage pivot points is separated from the outer ground linkage pivot point on the same side of said BMC unloader by approximately 25±0.5 inches;
   each of said upper bars and each of said lower bars is approximately 61.75±0.5 inches in length between said pivotal attachment points at said first and second ends thereof;
   each of said upper unloader linkage pivot points is separated from the lower unloader linkage pivot point on the same side of said BMC unloading bin by approximately 30±0.5 inches; said separation being substantially vertical when said BMC unloading bin is in an upright position.

5. The system of claim 1, further comprising:
   a fixed actuator frame on each side of said unloading bin;
   two actuators, one on each side of said unloading bin, each pivotally attached at a first end thereof to said fixed actuator frame, and each pivotally attached at a contact end thereof to said predetermined center point on its side of said unloading bin; wherein:
   to translate said unloading bin and simultaneously rotate said unloading bin through said arc, the contact ends of said actuators mechanically actuate said predetermined center points along said substantially straight line through an opposing force mechanically applied between the actuator frames and their respective predetermined center points.

6. The system of claim 5, each said actuator comprising a lead screw and said first and contact ends of each said actuator comprising first and contact ends of said lead screw; said system further comprising:

actuator rotation means rotating and pivotally attaching said lead screw to said actuator frame at said first end of said actuator; and two nuts, one on each side of said unloading bin, each pivotally attached to said predetermined center point on its side of said unloading bin, through which pass and within which rotate the lead screw on its side of said BMC unloading bin, such that rotating said lead screw at said first end thereof pushes said nuts with said contact ends of said lead screws and translates said unloading bin and simultaneously rotates said unloading bin about said predetermined center points.

7. The system of claim 1, further comprising:

a lower mechanical stop oriented at a predetermined dumping angle of approximately 30±3 degrees from horizontal, at least part of said lower mechanical stop restraining part of said unloading bin when said unloading bin is in an unloading position approximately 120±3 degrees from an upright position thereof in a substantially equivalent orientation of approximately 30±3 degrees from horizontal;

an upper mechanical stop further restraining part of said unloading bin when said unloading bin is in an unloading position approximately 120±3 degrees from an upright position thereof in a substantially equivalent orientation of approximately 30±3 degrees from horizontal; and an unloading surface proximate a base of said lower mechanical stop.

8. The system of claim 7, said unloading surface comprising a conveyor belt.

9. The system of claim 7, wherein:

said lower mechanical stop is located such that said part of said unloading bin restrained by said lower mechanical stop comprises an upper region of a forward outer surface of said unloading bin; and said upper mechanical stop is located such that said part of said unloading bin restrained by said upper mechanical stop comprises a rearward portion of a top surface of said unloading bin.

10. The system of claim 9, said unloading surface comprising a conveyor belt.

11. The system of claim 1:

said container unloader system comprising a bulk mail container (BMC) unloader system, said unloading bin comprising a BMC unloading bin, and a container to be unloaded by said system comprising a BMC, said BMC unloading bin further comprising:

a pair of BMC wheel slots in a base thereof, wherein an outer portion of said BMC wheel slots are separated by at least approximately 34 inches, and an inner portion of said BMC wheel slots are separated by at most approximately 24 inches; and BMC securing and restraining means for securing and restraining said BMC within said BMC unloading bin while said BMC unloading bin is translated and rotated; whereby:

said BMC is translated and rotated for unloading along with said BMC unloading bin; and said BMC is secured to and restrained by said BMC unloading bin during said translation and rotation for unloading.

12. The system of claim 11, said BMC securing and restraining means comprising at least one restraining ledge.

13. The system of claim 11, said BMC securing and restraining means comprising at least one restraining bar.

14. The system of claim 11, wherein said BMC securing and restraining means is located proximate at least part of an edge of a top opening of said BMC unloading bin farthest from a BMC entryway of said BMC unloading bin.

15. The system of claim 11, wherein said BMC securing and restraining means is located proximate at least part of a top opening of said BMC unloading bin.

16. The system of claim 11, wherein said BMC securing and restraining means is located proximate at least part of a BMC entryway of said BMC unloading bin.

17. A method for unloading a container, comprising the steps of:

a) configuring a container unloader to comprise:

an unloading bin comprising an upper unloader linkage pivot point on each side thereof and a lower unloader linkage pivot point on each side thereof;

an inner ground linkage pivot point on each side thereof and an outer ground linkage pivot point on each side thereof;

two upper bars, one on each side of said unloading bin, each pivotally attached at a first end to said upper unloader linkage pivot point on its side of said unloading bin, and each pivotally attached at a second end to said inner ground linkage pivot point on its side of said unloading bin;

two lower bars, one on each side of said unloading bin, each pivotally attached at a first end to said lower unloader linkage pivot point on its side of said unloading bin and each pivotally attached at a second end to said outer ground linkage pivot point on its side of said unloading bin, the lower bar and upper bar on each side of said unloading bin thereby crossing one another as a result of said attachments; and a ratio of approximately 25±1 to 61.75±1 to 30±1, respectively, among: on the same side of said container unloader, a separation between each said inner ground linkage pivot point and outer ground linkage pivot point; and a length of each of said upper bars and each of said lower bars between said pivotal attachment points at said first and second ends thereof; and on the same side of said unloading bin, a separation between each said upper unloader linkage pivot point and said lower unloader linkage pivot point, said separation being substantially vertical when said unloading bin is in an upright position;

b) moving and securing said container into a position within said container unloader; and c) unloading said container by actuating a pair of predetermined center points of said unloading bin, one such center point on each side of said unloading bin, to translate said unloading bin and said container therein, and to simultaneously rotate said unloading bin and said container therein, through an arc about said center points; whereby:

the translation and rotation of said unloading bin and said container therein is constrained to a single degree of freedom, and said single degree of freedom is uniquely specified by, the attachments of the bars to the linkage pivot points in combination with said 25±1 to 61.75±1 to 30±1 ratio.

18. The method of claim 17, further comprising the steps of:

mechanically actuating said predetermined center points along a substantially straight line.

19. The method of claim 17, said method for unloading a container comprising a method for unloading a bulk mail container (BMC), said unloader comprising a BMC unloader, and said unloading bin comprising a BMC unloading bin; said step of configuring said BMC unloader further comprising:

separating each of said inner ground linkage pivot points from the outer ground linkage pivot point on the same side of said BMC unloader by approximately 25±0.5 inches;

providing each of said upper bars and each of said lower bars with approximately 61.75±0.5 inches in length between said pivotal attachment points at said first and second ends thereof;

separating each of said upper unloader linkage pivot points from the lower unloader linkage pivot point on the same side of said BMC unloading bin by approximately 30±0.5 inches; said separation being substantially vertical when said BMC unloading bin is in an upright position.

20. The method of claim 17, said step of actuating said pair of predetermined center points further comprising the steps of:

fixing a fixed actuator frame on each side of said unloading bin;

pivotally attaching each of two actuators, one on each side of said unloading bin, at a first end thereof to said fixed actuator frame, and at a contact end thereof to said predetermined center point on its side of said unloading bin; and translating said unloading bin and simultaneously rotating said unloading bin through said arc, by said contact ends of said actuators mechanically actuating said predetermined center points along said substantially straight line, by mechanically applying an opposing force between the actuator frames and their respective predetermined center points.

21. The method of claim 20:

each said actuator comprising a lead screw and said first and contact ends of each said actuator comprising first and contact ends of each said lead screw;

each said lead screw passing through one of two nuts, one on each side of said unloading bin, each said nut pivotally attached to said predetermined center point on its side of said unloading bin; said step of actuating said container unloader further comprising the step of:

rotating said lead screw at said first end thereof using actuator rotation means pivotally attaching said lead screw to said actuator frame, thereby pushing said nuts with said contact ends of said lead screws and translating said unloading bin and simultaneously rotating said unloading bin about said predetermined center points.

22. The method of claim 17, said step of configuring said container unloader further comprising the steps of:

restraining said unloading bin using a lower mechanical stop oriented at a predetermined dumping angle of approximately 30±3 degrees from horizontal, at least part of said lower mechanical stop restraining part of said unloading bin when said unloading bin is in an unloading position approximately 120±3 degrees from an upright position thereof in a substantially equivalent orientation of approximately 30±3 degrees from horizontal;

further restraining said unloading bin using an upper mechanical stop restraining part of said unloading bin when said unloading bin is in an unloading position approximately 120±3 degrees from an upright position thereof in a substantially equivalent orientation of approximately 30±3 degrees from horizontal; and providing an unloading surface proximate a base of said lower mechanical stop.

23. The method of claim 22, said unloading surface comprising a conveyor belt.

24. The method of claim 22, further comprising the steps of:

locating said lower mechanical stop is such that said part of said unloading bin restrained by said lower mechanical stop comprises an upper region of a forward outer surface of said unloading bin; and locating said upper mechanical stop such that said part of said unloading bin restrained by said upper mechanical stop comprises a rearward portion of a top surface of said unloading bin.

25. The method of claim 24, said unloading surface comprising a conveyor belt.

26. The method of claim 17, said method for unloading a container comprising a method for unloading a bulk mail container (BMC), said container comprising a BMC, said container unloader comprising a BMC unloader, said unloading bin comprising a BMC unloading bin; said step of moving and securing said BMC into position within said BMC unloader further comprising the steps of:

wheeling a plurality of BMC wheels into a pair of BMC wheel slots in a base of said BMC unloading bin, wherein an outer portion of said BMC wheel slots are separated by at least approximately 34 inches, and an inner portion of said BMC wheel slots are separated by at most approximately 24 inches; and securing and restraining said BMC within said BMC unloading bin while said BMC unloading bin is translated and rotated; whereby:

said BMC is translated and rotated for unloading along with said BMC unloading bin; and said BMC is secured to and restrained by said BMC unloading bin during said translation and rotation for unloading.

27. The method of claim 26, said step of securing and restraining said BMC comprising the further steps of using at least one securing and restraining means comprising at least one restraining ledge.

28. The method of claim 26, said step of securing and restraining said BMC comprising the further steps of using at least one securing and restraining means comprising at least one restraining bar.

29. The method of claim 26, said step of securing and restraining said BMC comprising the further step of securing and restraining said BMC proximate at least part of an edge of a top opening of said BMC unloading bin farthest from a BMC entryway of said BMC unloading bin.

30. The method of claim 26, said step of securing and restraining said BMC comprising the further step of securing and restraining said BMC proximate at least part of a top opening of said BMC unloading bin.

31. The method of claim 26, said step of securing and restraining said BMC comprising the further step of securing and restraining said BMC proximate at least part of a BMC entryway of said BMC unloading bin.

* * * * *